(12) United States Patent
Scott et al.

(10) Patent No.: US 8,616,891 B2
(45) Date of Patent: Dec. 31, 2013

(54) ARCHITECTURE FOR DELIVERING RELATIONAL SKILLS TRAINING CONTENT

(75) Inventors: Christopher A. Scott, Riverdale, NY (US); Cynthia Scott, Riverdale, NY (US)

(73) Assignee: Psych-Tech, Inc., East Chatham, NY (US)

( * ) Notice: Subject to any disclaimer, the term of this patent is extended or adjusted under 35 U.S.C. 154(b) by 371 days.

(21) Appl. No.: 12/869,067

(22) Filed: Aug. 26, 2010

(65) Prior Publication Data
US 2011/0076656 A1    Mar. 31, 2011

Related U.S. Application Data

(60) Provisional application No. 61/237,292, filed on Aug. 26, 2009.

(51) Int. Cl.
  *G09B 19/00*    (2006.01)
(52) U.S. Cl.
  USPC ............................................ 434/236; 434/237
(58) Field of Classification Search
  USPC ................ 434/219, 156–185, 236–238, 252, 434/318–365, 428, 433; 463/31, 42; 709/204; 600/26–28, 300–301; 705/11; 703/12
  See application file for complete search history.

(56) References Cited

U.S. PATENT DOCUMENTS

2008/0254419 A1* 10/2008 Cohen ........................... 434/219

* cited by examiner

*Primary Examiner* — Timothy A Musselman
(74) *Attorney, Agent, or Firm* — Craige Thompson; Thompson Patent Law Offices PC

(57) ABSTRACT

Apparatus and associated methods relate to a system for delivering interactive relationship skills training with multiple feedback source types for the benefit of remote players who access the system via electronic communication networks. In an illustrative example, some systems may deliver relationship skills training content having restricted access to two or more types of feedback sources. Feedback sources that may be accessed at first, second, third and fourth tiers may respectively include, for example, predetermined expert responses, a virtual partner, a remote human partner, and a moderated group of remote players. Players may gain access to feedback sources at progressively higher tiers of psychological complexity by accumulating a sufficient relational skills score at each tier.

6 Claims, 3 Drawing Sheets

ARCHITECTURE FOR DELIVERING RELATIONAL SKILLS TRAINING CONTENT

CROSS-REFERENCE TO RELATED APPLICATIONS

This application claims the benefit of U.S. Provisional Patent Application entitled "On-Line Training System for Training Empathy Skills," Ser. No. 61/237,292, which was filed by Christopher A. Scott on Aug. 26, 2009, the entire contents of which are incorporated herein by reference.

TECHNICAL FIELD

Various embodiments relate generally to network computer systems for delivering relational skills training.

BACKGROUND

Many of the psychological needs of the American populace are currently being unmet. For example, the National Opinions Research Center's General Social Survey of 2004 reports increased social isolation with 25% of Americans acknowledging personal social isolation, in that they have no one to confide and discuss personal issues. According to the same survey, this percentage has more than doubled since 1985. The rapidly expanding "plugged in" generation uses technology to address this issue, as they spend an increasing amount of time on the Internet and Social Media. This phenomenon is an attempt to generate personal connections and relationships in the context of an online community, which results in the diminution of authentic and meaningful psychological experiences in real life.

SUMMARY

Apparatus and associated methods relate to a system for delivering interactive relationship skills training with multiple feedback source types for the benefit of remote players who access the system via electronic communication networks. In an illustrative example, some systems may deliver relationship skills training content having restricted access to two or more types of feedback sources. Feedback sources that may be accessed at first, second, third and fourth tiers may respectively include, for example, predetermined expert responses, a virtual partner, a remote human partner, and a moderated group of remote players. Players may gain access to feedback sources at progressively higher tiers of psychological complexity by accumulating sufficient relational skills score at each tier.

Various embodiments may achieve one or more advantages. For example, a player may benefit substantially from increasingly interactive types of feedback sources that progress from automated to dyad to group feedback, which may be used to determine the player's relationship skills score. Each player may develop their own relational skills by giving and receiving useful feedback focused on the relational skills of themselves or other players. Various embodiments may provide increased access to relationship skills training in a wide variety of contexts from the convenience of a computer with Internet access. Players may access relational skills training content at convenient times and locations using any convenient internet-connected computer with a web browser, for example. The architecture in the network implementations may foster a substantial supply of players to fit a wide range of profiles (e.g., age, background, gender, etc. . . . ) for the type of training contexts that a player may request at any given time. At some advanced levels, players will have experienced a common background in the relationship skills training, and may provide substantially beneficial feedback among the members of various moderated groups, for example.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

In various embodiments, a relational skills training system helps develop a user's relational skills, such as empathy skills, for example. The training systems may deliver multimedia and/or interactive content to the user through an Internet-connected browser, taking advantage of an important and popular information channel. Implementations of a progressive training system may offer multiple levels of advancement based on feedback from one or more level-dependent feedback sources, alone or in combination with the player's own self-evaluation and/or predetermined expert responses. As the player progresses through more advanced levels, the player may be offered interaction with increasingly sophisticated feedback sources in increasingly complex interpersonal contexts, both of which may be selected by the player. The feedback sources may include expert predetermined responses, virtual partners, single real partners (e.g., dyad), multiple real on-line (e.g., remote over a network) partners, or multiple real partners moderated by a trained moderator. The various exemplary feedback sources may advantageously help to determine a measure of the player's relational skill, for example, an empathy quotient (EQ) score. The player may be motivated to improve their score, for example, to gain access to higher levels of the skill training architecture.

Figure 1:
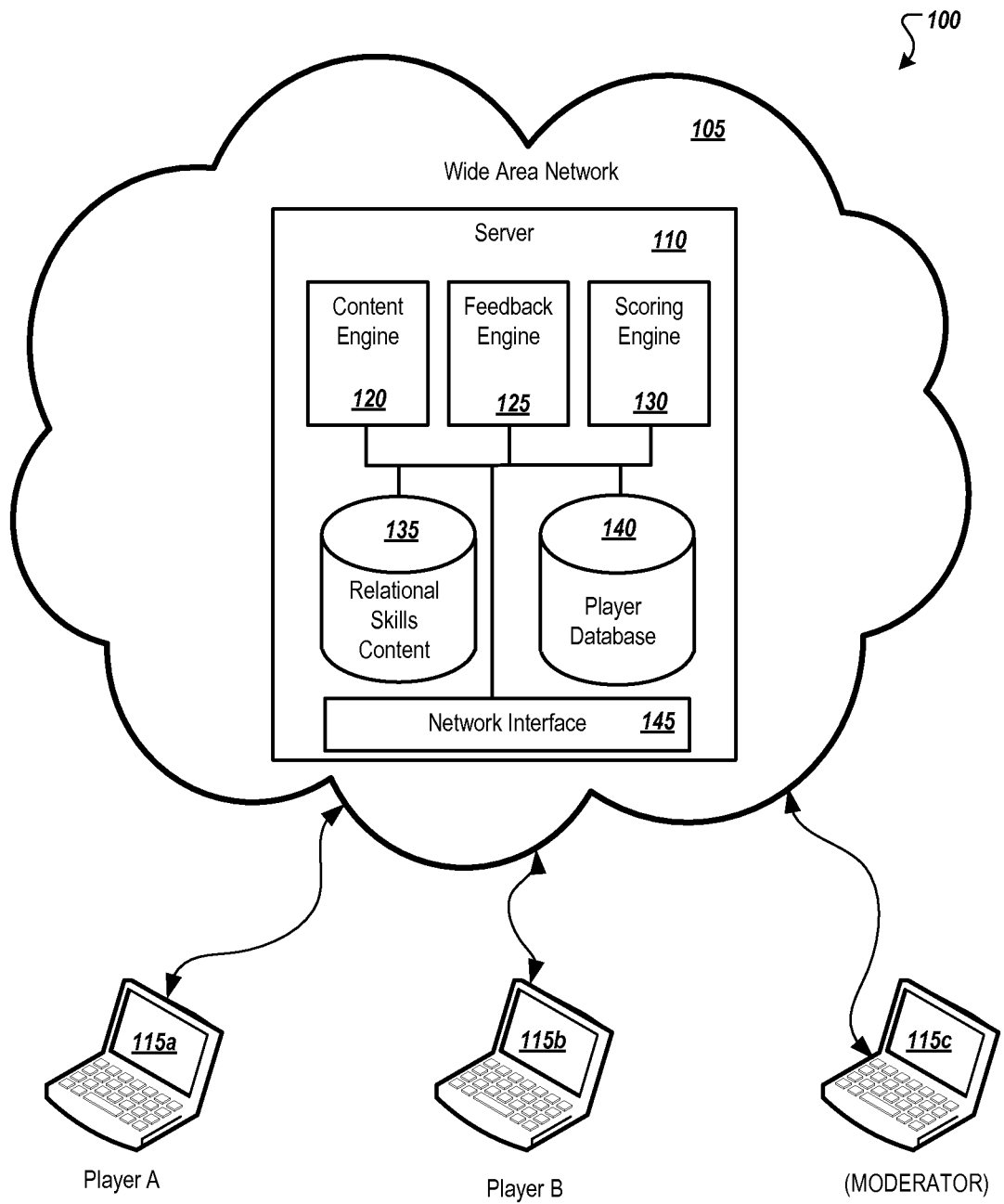
FIG. 1 shows an exemplary embodiment of a relational skills training system 100 that uses feedback about a player's empathic response to ascertain and develop the player's relational skills.

FIG. 1 shows an exemplary embodiment of a relational skills training system 100 that uses feedback about a player's empathic response to ascertain and develop the player's relational skills. The relational skills training system 100 includes a wide area network 105, a server 110, and a plurality of client computers 115a, 115b, and 115c. The wide area network 105 couples the server 110 with the plurality of client computers 115a, 115b, and 115c. Player A on client computer 115a, a Player B on client computer 115b, and a Moderator on a client computer 115c may each simultaneously and/or independently access the relational skills training program executed by the server 110 through an internet browser. Through the network interface 145 over the wide area network 105, Player A on client computer 115a may interact, for example, with Player B on client computer 115b, alone or in combination with the Moderator on client computer 115c and/or additional players (not shown).

The server 110 includes a content engine 120, a feedback engine 125, a scoring engine 130, a relational skills content database 135, a player database 140, and a network interface 145. The content engine 120 may generate electronic packets of information that may be delivered to the client computers 115a, 115b, and 115c via the network interface 145. In various examples, the electronic packets of information may relate to the content of a particular tier, including what or whom the player is interacting with, or how the empathy quotient (EQ) score is determined. For example, if the player accesses tier 1, the electronic packets of information may be related to a player establishing a baseline EQ score by engaging with a website, which may generate questions based on a video. The scoring engine 130 may receive the player's responses to those questions, and compare the responses to a database of expert predetermined responses. In another example, if the player accesses a third tier (e.g., tier 3), the electronic packets of information may relate to a player engaging with a single real partner (e.g., dyad). The feedback engine 125 may cooperatively parse and/or route responses to content from the player to the partner, and then may further route feedback from the partner about the relational skill of the player's responses, to the scoring engine 120. The scoring engine 120 may determine a cumulative EQ score for the player by considering responses from the player about the content, feedback the partner about the player's responses, and expert predetermined responses.

The content engine 120 is coupled with the feedback engine 125, the scoring engine 120, the relational skills content database 135, and the player database 140. When a player accesses more advanced tiers 2-5, the player may interact with at least one remote partner in an interpersonal context of the player's choosing. The content engine 120 may receive the player's empathic responses either to interactions with the partner or to questions relating to the interactions and transmit those responses to the partner for feedback. The relational skills content database 135 may supply content having an interactive format, such as games, videos, or chat to the content engine 120.

In an illustrative example, some content from the relational skills content database 135 may be delivered in accordance with a predetermined psychological framework. For example, if the player decides to work on his empathy skills, the appropriate content may be delivered under a predetermined empathy framework. In one example, the system 100 may be organized to deliver empathy skills training in multiple stages. The first stage may introduce the player to the empathy framework. The second stage may involve a series of games that allow the player to recognize and practice self-attunement. The third stage may involve a series of interactive scenarios that allow the player to interact with at least one virtual or human remote partner to recognize and practice their attunement to others. The fourth stage may allow the player to interact with a partner within the framework of a game or in freeform using internet based chat or VOIP and online video communication. The player's empathic responses are analyzed to determine the degree of their positive or negative mirroring. The player may receive feedback on the quality of the empathy shown in the player's responses from a feedback source. The player is allowed the opportunity to play multiple games, for example, to improve the empathic skill in their responses.

To ascertain the player's empathic skill progress, the feedback engine 125 may collect and process feedback from the partner on the player's empathic performance, feedback from the player on their personal empathic performance, and may compare the player's responses to expert predetermined responses. The feedback engine 125 may transmit feedback about the player's relational skills from the partners to the scoring engine 130. The scoring engine 130 may generate a score based on any or all of the three feedback sources and may update the cumulative player score. The scoring engine 130 may determine whether the cumulative player score meets the predetermined threshold for advancing to the next tier. If the cumulative player score meets the predetermined threshold, then the player is eligible to advance to the next tier. The player may decide to advance to the next tier or re-play the previous tiers. In some implementations, the player must submit appropriate payment to advance to the next tier. The player database may 140 store the player's eligibility for different tiers.

The relational skills training system 100 may be configured to perform an exemplary method 200 to develop a player's empathy by using feedback from various sources about the player's empathic performance. The method may be implemented, for example, in one or more sets of instructions that, when executed by a processor on the server 110, for example, perform operations to accomplish various steps of the method 200. For example, portions or all of the steps of the method may be implemented as a computer program product. In some embodiments, the computer program product may include one or more data stores containing some of the instructions associated with the method. In various implementations, the data store may be a volatile or non-volatile memory, programmed computer, or media that can contain a representation of the instructions for performing steps of the method.

In an illustrative example, the method 200 includes a step in which the server 110 generates an electronic message at step 205 to request player (e.g., establish player identifying information to be stored in the player database). At step 210, the server 110 initializes the program to begin at tier 1 after the player has established a baseline EQ score at the introductory tier. At step 215, the player database 140 initializes the player score for the current tier, which may be the previously established baseline EQ score. At step 220, the content engine 120 receives player's criteria for context of the interaction. At step 225, the content engine 120 identifies the feedback source according to the player criteria and current tier. At steps 230 and 235, the relational skills content 135 selects and delivers content to player via an electronic communication channel (e.g., wireless network, wide area network, the Internet, etc. . . . ).

The content engine 120 receives information related to the player's response to the content at step 240. The information reflecting the player's response is transmitted to the feedback source at step 245. At step 250, feedback from the feedback source is received and processed. A score is generated for the tier, and a cumulative score is generated taking into account the score for the tier. At step 260, the player's score is updated in the player database 140. At step 265, the scoring engine 130 determines whether the updated score meets a predetermined threshold. If the score does not meet the predetermined threshold, then the player may initiate another session at the current or lower tiers at step 230. If the score does meet the predetermined threshold, then the system may send an electronic message to invite the player to advance to the next tier at step 270.

The system determines whether the player chooses to advance to the next tier at step 275. If the player does not choose to advance, then the player may initiate another session at the current or lower tiers at step 230. If the player does choose to advance, then the player submits payment at step 280. The tier is incremented at step 285, and the process returns to step 215 to initialize the score for the new tier.

Figure 2:
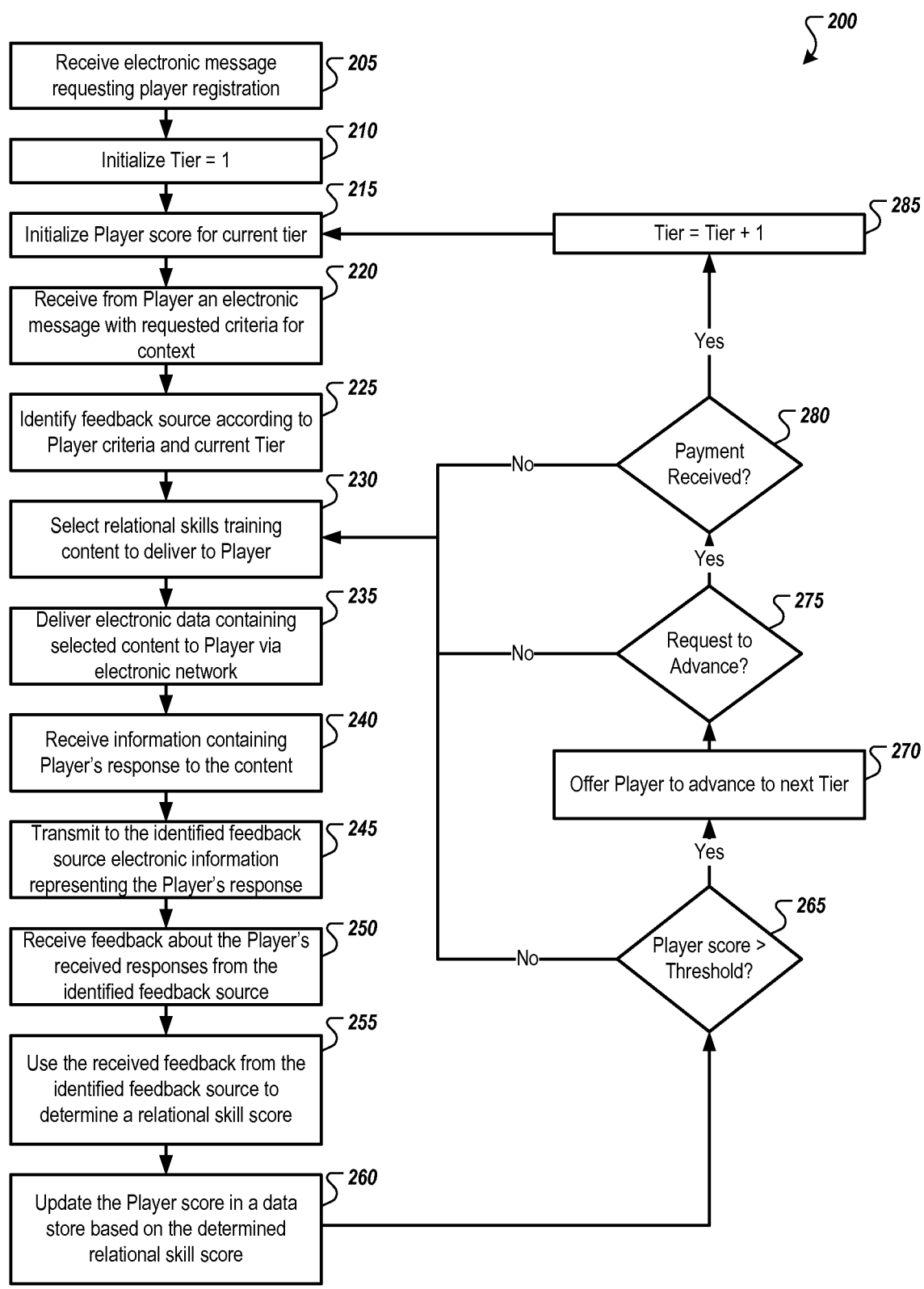
FIG. 2 shows an exemplary method 200 that may be performed by the relational skills training system 100.
Figure 3:
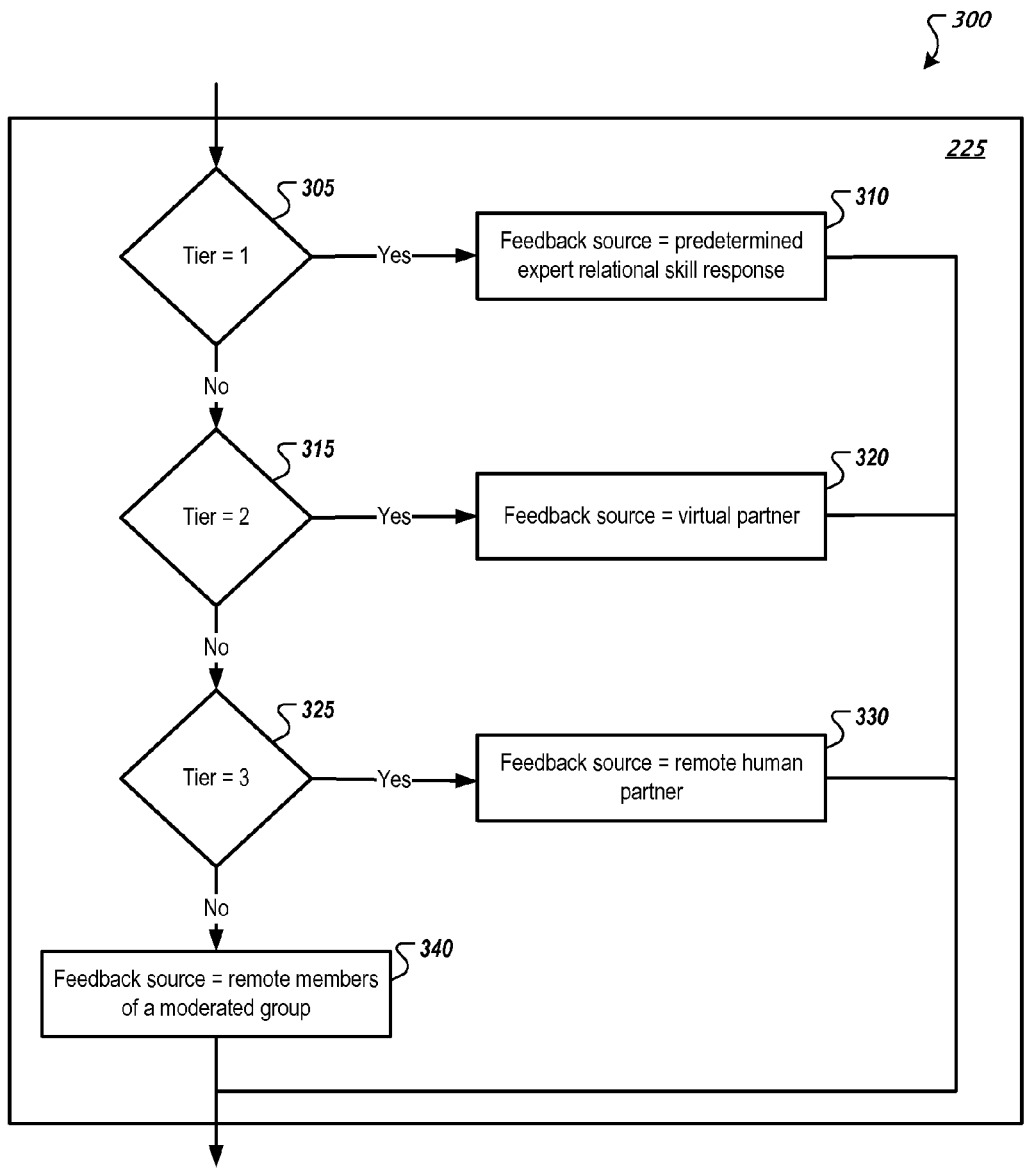
FIG. 3 shows the steps of an exemplary subroutine 300 that may be used to implement step 225 of FIG. 2.

FIG. 3 shows the steps of an exemplary set of steps 300 that may be used to implement step 225 of FIG. 2. In some implementations, the steps 300 may be in the form of a subroutine of instructions that may identify the feedback source according to player criteria and the current tier that the player is on.

At step 305, the method includes checking whether the current tier is tier 1. If the current tier is tier 1, then the feedback source is set to include a predetermined expert relational skill response at step 310.

If the current tier is not tier 1, then, at step 315, the method includes checking whether current tier is tier 2. If the current tier is tier 2, then the feedback source is set to include a virtual partner at step 320. In an illustrative example, the content engine 120 may retrieve content from the relational skills database 135 and deliver content to the player in a format that presents a virtual partner to the player. In an example, the virtual partner, an avatar, may provide an interactive communication with the player. In an embodiment, the avatar may be presented in the form of chat relating to the content using a predetermined set of communications to deliver to the player. In some examples, the virtual partner may represent a set of pre-programmed interactive dialogue responses that help to promote relational skills training for the player. The virtual partner at tier 2, for example, may provide the player with a perceived level of interactivity that may be substantially higher than that perceived at tier 1.

If the current tier is not tier 2, then, at step 325, the method includes checking whether the current tier is tier 3. If the current tier is tier 3, then the feedback source is set to include a remote human partner at step 330.

If the current tier is not tier 3, then, the feedback source is set to include remote members of a moderated group at step 340.

Although various embodiments have been described with reference to the figures, further examples are contemplated. In an illustrative example, a player may progress through different tiers of the interactive on-line empathy skills training web site. When a new player navigates to the website and submits the appropriate payment, the new player is allowed access to registration for the Introductory Tier. On the Introductory Tier, the new player establishes a base empathy quotient (EQ) score by answering questions related to a presented scenario. The scenario may be presented as a video or described as text. Based on the player's answers, the scoring engine presents the base EQ score. The base EQ score may be increased or decreased on subsequent plays of the same or a different tier. The base EQ score is stored in a tier access database for use on the same tier or a different tier if the player decides to pursue empathy training.

In this example, empathy training is presented on tiers 1-5. Each tier is organized according to a predetermined empathy training framework, which may be referred to herein as a roadmap. The program deconstructs empathy into an empathic attunement process in multiple steps. The first step may present games to assess the player's level of self attunement. The second step may allow a player to interact with a partner in the framework of a game or in real-time over internet based chat, VOIP (voice over internet protocol) and/or online video communication to assess the player's level of attunement to other. The third step may allow a player to interact with a partner in the framework of a game or in freeform over internet based chat or VOIP and online video communication to assess the player's empathic responses. The goal of the empathy training program may include fostering an empathic understanding between the player and at least one partner, or feedback source, as presented on each of the tiers. After a general introduction, each step is presented in the form of interactive games or using, for example, internet based chat or VOIP and online video communication. The games may be the same or different for each tier. These games may include questions in the form of multiple choice or yes/no, discussion format, or the like.

After completing the Introductory Tier and receiving the base EQ score, in this embodiment, the player may submit payment for access to registration for Tier 1. On Tier 1, the player is introduced to the empathy training framework. The player's responses to these questions are compared with expert predetermined responses, and the scoring engine generates a score based on the comparison. This score is tacked onto the base EQ score for a cumulative EQ score. If the cumulative EQ score meets the predetermined threshold for advancing to Tier 2, the player will receive an invitation to advance to Tier 2. If the cumulative EQ score fails to meet the predetermined threshold for advancing to Tier 2, the player can attempt to increase his score by re-doing either or both Introductory Tier and Tier 1 or certain games on either or both those tiers.

If the player receives an invitation to advance to Tier 2 and submits appropriate payment, the player will be afforded access to registration to Tier 2. On Tier 2, the player engages with a virtual partner in an empathic environment. The player may select the characteristics of the virtual partner and empathic environment. In selecting the characteristics of the virtual partner, the player may specify, for example, the personality, age, race, sex, religion, political beliefs, body type, sexual orientation, occupation, socioeconomic status, and alcohol/drug use/cigarette use of the virtual partner. In the selecting the environment, the player may choose to engage with the virtual partner, for example, in a sibling, romantic, parent/child, professional, patient/caretaker, client/lawyer, or customer/business relationship. In a romantic relationship, the player and virtual partner may, by way of example and not limitation, be dating, married, or a committed couple. In a professional relationship, the player and the virtual partner may be employee and supervisor. The player and selected virtual partner engage with each other in games presented for each of the steps, and the player's responses are transmitted to the virtual partner. The scoring engine generates a score based on feedback by the virtual partner, expert predetermined responses, and self-evaluation by the player. This score may be accumulated with the cumulative EQ score after completing Tier 1 for an updated cumulative EQ score. If the updated cumulative EQ score meets the predetermined threshold for advancing to Tier 3, the player will receive an invitation to advance to Tier 3. If the cumulative EQ score fails to meet the predetermined threshold for advancing to Tier 3, then the player can attempt to increase his score by re-doing either or both Introductory Tier, Tier 1, or Tier 2 or certain games on any or all of the Introductory Tier, Tier 1, or Tier 2.

If the player receives an invitation to advance to Tier 3 and submits appropriate payment, the player will be afforded access to registration to Tier 3. On Tier 3, the player engages with a real partner in an empathic on-line game environment. The real partner is another player in remote communication with the system via an electronic communication channel. The system matches players according to each player's desired characteristics for a partner and interpersonal relationship context as described above for Tier 2. The players engage with each other in games. Some interactions may include real-time, or freeform communications, using technologies, such as internet based chat, webcam, and VOIP and online video communication. Each player's responses to questions presented in a game or interactions with each other and are evaluated by the other player. The scoring engine for the system generates a score based on feedback by the real partner, alone or in combination with expert predetermined responses, and/or self-evaluation by the player. This score is accumulated onto the cumulative EQ score after completing Tier 3 for an updated cumulative EQ score. If the updated cumulative EQ score meets the predetermined threshold for advancing to Tier 4, the player will receive an invitation to advance to Tier 4. If the cumulative EQ score fails to meet the predetermined threshold for advancing to Tier 4, the player can attempt to increase his score by re-doing either or both Introductory Tier, Tier 1, Tier 2, or Tier 3 or certain games on any or all of the Introductory Tier, Tier 1, Tier 2, or Tier 3. Upon successful completion through Tier 3, the player may earn the status of EQ Master Level 1. The player may also opt to contact a virtual counseling center for individual consultation on their interpersonal dynamics.

If the player receives an invitation to advance to Tier 4 and submits appropriate payment, the player will be afforded access to registration to Tier 4. On Tier 4, the player engages with multiple real partners in an empathically-focused environment. The real partners are players. The system matches players according to each player's desired characteristics for a partner and interpersonal relationship context as described above for Tier 2. The players engage with each other in games within games or in freeform using technologies, such as email, chat, webcam, and Skype. Each player's responses to questions presented in a game or interactions with each other are evaluated by the other players. The scoring engine generates a score based on feedback by the real partners, expert predetermined responses, and self-evaluation by the player. This score is tacked onto the cumulative EQ score after completing Tier 4 for an updated cumulative EQ score. If the updated cumulative EQ score meets the predetermined threshold for advancing to Tier 5, the player will receive an invitation to advance to Tier 5. If the cumulative EQ score fails to meet the predetermined threshold for advancing to Tier 5, the player can attempt to increase his score by re-doing either or both Introductory Tier, Tier 1, Tier 2, Tier 3, or Tier 4 or certain games on any or all of the Introductory Tier, Tier 1, Tier 2, Tier 3, or Tier 4.

If the player receives an invitation to advance to Tier 5 and submits appropriate payment, the player will be afforded access to registration to Tier 5. On Tier 5, the player engages with multiple real partners moderated by trained staff in a virtual group. The real partners are players. The system matches players according to each player's desired characteristics for a partner and interpersonal relationship context as described above for Tier 2. The players engage with each other in games within games or in freeform using technologies, such as chat, webcam, and Skype. Each player's responses to questions presented in a game or interactions with each other are evaluated by the other players and the trained moderator. The scoring engine generates a score based on feedback by the real partners and trained staff, expert predetermined responses, and self-evaluation by the player. This score is accumulated with the cumulative EQ score. If the updated cumulative EQ score meets the predetermined threshold for advancing to Tier 5, the player will achieve the status of EQ Master Level 2. If the cumulative EQ score fails to meet the predetermined threshold for advancing to Tier 5, the player can attempt to increase his score by re-doing either or both Introductory Tier, Tier 1, Tier 2, Tier 3, Tier 4, or Tier 5 or certain games on any or all of the Introductory Tier, Tier 1, Tier 2, Tier 3, Tier 4, or Tier 5.

For each tier, the training system may provide a graphic representation of the player's position on the roadmap as well as current score information for the player.

In a second illustrative example, sample games for each step of the empathy training program are played on a particular tier. The player may opt to play one or more games available in each step. Each step may generally provide an instructional roadmap, including a didactic that explains the theory and background, a statement of the objective of a game, a pre-game warm-up that prepares the player for the game, and the game.

In the introduction, the player may ascertain their feelings and other's feelings toward certain situations. The player may engage in a pre-game warm up "Yes You Get Me! Why Does It Feel So Good?" that presents some scenarios to generate some thought about how it feels when someone reflects back to us what we want to see in ourselves or how we are feeling. Follow up questions may include who mirrors us now and who did it during our childhood. Other scenarios may include how it feels when someone is distracted when you are talking to them. The player answers those questions and records their answers in their personal empathy roadmap journal. The player scores themselves and generates their EQ score. These questions may be multiple choice or yes/no format. After the pre-game warm up, the player may engage in the main game "Narcissistic Feast" that presents some scenarios encouraging the player to have a fantasy of what the player wants to see in him and what the player want others to see in him. The player may engage in other main games "What Are They Feeling?" with the goal of the players identifying the subtle different between themselves in the other person's and recognizing personal projection based on their experience. In this exemplary game, the player is presented with multiple pictures in succession, such as "Man in silhouette under tree," Laughing woman with child on lap," "Girl looking out window," and "Little girl looking at camera." Questions for each picture include asking what each person in the picture is feeling, the player's interpretation of what is going on, what the player is feeling, and other alternative interpretations.

In the Self-Attunement Step, the player may determine their brain direction. The player may engage in a pre-game warm up "Which Brain Do You Prefer?" that determines whether they are right-brain or left-brain oriented. The player is presented with a picture of an ice flow and asked to describe what they see, their thoughts about the picture, the feelings the picture generates, and self-evaluation of whether they are right-brain or left-brain oriented. In the main game "You in Fast-Forward," the player observes multiple pictures in fast succession, such as "Forest with Blue Flowers," "Coastal Sunset with Rocks," "Sunbow with Tree," and "People Shot." The player observes their first thoughts and feelings about each picture.

In the Self-Attunement Step, the player may determine their self-state with a pre-game "What's Your Story?" with scenarios based on comprehension of "Other's" point of view or feelings. The main game extends the idea by having the player write a person scenario in their Personal Empathy Roadmap Journal and trying to imagine reading the scenario from different perspectives, such as the player himself, a casual acquaintance, someone you don't trust, a loving friend, observing what feelings are attributed to the persons in each perspective and judgments and assumptions made by the persons in each perspective.

In the Self-Attunement Step, the player may determine their Perspective Taking For example, a pre-game may involve the player viewing a picture of a woman crying. The player is asked whether the woman is happy or sad. The player is asked same question after being told that the woman just left a funeral or a wedding. The player is then asked some self-evaluation questions, such as difficulty in shifting perspectives and feeling and sense of self-state with perspective shifting.

In the Self-Attunement Step, the player may determine their Inhibitory Mechanism. For example, the player views a series of pictures and observes their personal response. Questions include what their instantaneous reflex was and why they had that response. The game offers possible observations of internal experience, such as "Did you look away to soften the impact?," "Did you pretend you didn't have a feeling response?," or "Did you re-interpret the situation or your feelings, as well as the other person's feeling, to mediate yours?"

In the Attunement to Other Step, the player may interact with their partner if they are on tiers 2-5. For example, if the player is on tier 2, they may interact with a virtual partner. If the player is on tier 3, they may interact with a single real partner. The games on this step are designed to gauge Empathic Listening and Empathic Inquiry. They may test the player's observation of the situation and their attunement to their partner. Is the player able to deeply understand what is going on beyond the words being exchanged?

In the Mirroring, Feedback & Correction Step, the player and their partner can play interactive games with each other and compare responses. One of these games may be directed to identifying empathic vs. non-empathic responses. The players may view a scenario with a famous couple at the beach after their son's asthma attack. The player is asked to observe the characters' responses and determine the nature of responses of the characters. The player may be asked to rate displayed responses on a scale of degrees of pity, sympathy, empathy, inquiry, and mirroring.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. An on-line interactive empathy training system using feedback about a user's empathic responses, the system comprising:
    a network interface configured to communicate with at least one remote client processor;
    a server coupled to the network interface and configured to communicate electronic messages via the network interface, wherein the server comprises:
    a content engine configured to generate electronic packets of information that, when delivered to the remote client processor, provide a user with access to an interaction with a virtual partner, receiving an empathic response from the user, transmitting the empathic response to the virtual partner, and receiving feedback from the virtual partner on the user's empathic response;
    a scoring engine for generating a cumulative score based in part on feedback from the virtual partner on the user's empathic response in an interaction between the user and the virtual partner;
    a processor for comparing the cumulative score with a predetermined threshold for interaction with a virtual partner and providing user access to registration to an interaction with a real partner if the cumulative score is greater than or equal to the predetermined threshold for the interaction with the real partner; and
    a tier access database for storing the user's cumulative score and access rights to different interactions.

2. The system of claim 1,
    wherein the content engine provides the user on the computer access to computer generated scenarios for testing empathy skills and receives an empathic response from the user to the computer generated scenario,
    wherein the scoring engine generates a cumulative score based on the user's empathic response,
    wherein the processor compares the cumulative score with a predetermined threshold for the computer generated scenario and provides user access to registration to the interaction with the virtual partner if the cumulative score is greater than or equal to the predetermined threshold for the computer generated scenario, and
    wherein the tier access database updates the user's cumulative score and access rights to different interactions.

3. An on-line interactive empathy training system for developing a user's empathy skills by evaluating the user's empathic response in an interaction with a partner based on the partner's feedback on the user's empathic response, the system comprising:
    a plurality of user computers; and
    a server accessible by each of the plurality of computers through the internet, wherein the server comprises:
    a content engine for providing a user on a user computer access to an interaction with a single real partner, receiving an empathic response from the user, transmitting the empathic response to the real partner, and receiving feedback from the real partner on the user's empathic response;
    a scoring engine for generating a cumulative score based in part on feedback from the real partner on the user's empathic response in the interaction between the user and the real partner;
    a processor for comparing the cumulative score with a predetermined threshold for interaction with a real partner and providing user access to registration to an interaction with a plurality of real partners if the cumulative score is greater than or equal to the predetermined threshold for interaction with a real partner; and
    a tier access database for storing the user's cumulative score and access rights to different interactions and feedback sources.

4. The system of claim 3,
    wherein the content engine provides the user on the computer access to computer generated scenarios for testing empathy skills and receives an empathic response from the user to the computer generated scenario,
    wherein the scoring engine further generates the cumulative score based on the user's empathic response to the computer generated scenario,
    wherein the processor further compares the cumulative score with a predetermined threshold for the computer generated scenario and provides user access to registration to the interaction with a virtual partner if the cumulative score is greater than or equal to the predetermined threshold for the computer generated scenario, and
    wherein the tier access database further stores the user's cumulative score and access rights to different interactions.

5. An on-line interactive empathy training system for developing a user's empathy skills by evaluating the user's empathic response in an interaction with a partner based on the partner's feedback on the user's empathic response comprising:

a plurality of user computers; and a server accessible by each of the plurality of computers through the internet, wherein the server comprises:

a content engine for providing a user on a user computer to access to an interaction with a virtual partner, receiving an empathic response from the user, transmitting the empathic response to the virtual partner, and receiving feedback from the virtual partner on the user's empathic response;

a scoring engine for generating a cumulative score based in part on feedback from the virtual partner on the user's empathic response in an interaction between the user and the virtual partner;

a processor for comparing the cumulative score with a predetermined threshold and providing user access to registration to an interaction with a plurality of real partners if the cumulative score is greater than or equal to the predetermined threshold; and a tier access database for storing the user's cumulative score and access rights to different interactions.

6. The method of claim 5, wherein the content engine provides a user on a user computer access to an interaction with a single real partner, receives an empathic response from the user, transmits the empathic response to the single real partner, and receives feedback from the single real partner on the user's empathic response, wherein the scoring engine generates a cumulative score based in part on feedback from the single real partner on the user's empathic response in an interaction between the user and the single real partner, wherein the processor compares the cumulative score with a predetermined threshold for interaction with a single real partner and provides user access to registration to an interaction with a plurality of real partners if the cumulative score is greater than or equal to the predetermined threshold for interaction with a single real partner, and wherein the tier access database updates the user's cumulative score and access rights to different interactions.

* * * * *